US012649108B2

(12) United States Patent
Cao et al.

(10) Patent No.: US 12,649,108 B2
(45) Date of Patent: Jun. 9, 2026

(54) APPLE WATCH-BASED SOMATOSENSORY GAME OPERATING METHOD

(71) Applicant: Shenzhen Shimi Network Technology Co., Ltd., Shenzhen (CN)

(72) Inventors: Qianfu Cao, Shenzhen (CN); Yuan Yao, Shenzhen (CN)

(73) Assignee: Shenzhen Shimi Network Technology Co., Ltd., Shenzhen (CN)

( * ) Notice: Subject to any disclaimer, the term of this patent is extended or adjusted under 35 U.S.C. 154(b) by 206 days.

(21) Appl. No.: 18/244,232

(22) Filed: Sep. 9, 2023

(65) Prior Publication Data

US 2025/0018293 A1     Jan. 16, 2025

(30) Foreign Application Priority Data

Jul. 15, 2023    (CN) .......................... 202310873114.6

(51) Int. Cl.
| | |
|---|---|
| *A63F 13/5372* | (2014.01) |
| *A63F 13/212* | (2014.01) |

(Continued)

(52) U.S. Cl.
CPC ........ *A63F 13/5372* (2014.09); *A63F 13/212* (2014.09); *A63F 13/285* (2014.09); *A63F 13/533* (2014.09); *A63F 13/211* (2014.09)

(58) Field of Classification Search
CPC .. A63F 13/5372; A63F 13/212; A63F 13/285; A63F 13/533; A63F 13/211;

(Continued)

(56) References Cited

U.S. PATENT DOCUMENTS

| | | | | |
|---|---|---|---|---|
| 11,826,652 B2 * | 11/2023 | Dugan | ................. | A63F 13/245 |
| 12,059,626 B2 * | 8/2024 | Odabas | ................... | A63F 13/65 |

(Continued)

OTHER PUBLICATIONS

Pokemon Go Apple Watch App Demo! PokeStops, Wild Pokemon Notifications and Workout. Youtube.com. Online. Dec. 28, 2016. Accessed via the Internet. Accessed Jun. 27, 2025. <URL: https://www.youtube.com/watch?v=Kzb5qGwCcYE> (Year: 2016).*

*Primary Examiner* — Carl V Larsen
(74) *Attorney, Agent, or Firm* — IPro, PLLC

(57)     ABSTRACT

Disclosed in the present invention are an Apple Watch-based somatosensory game operating method and device, and a computer-readable storage medium. The method comprises: when a somatosensory game application is started, by a terminal, sending wake-up information to a bound Apple Watch; after the wake-up information is received, by the Apple Watch, starting a watch application associated with the somatosensory game application; after a somatosensory game in the somatosensory game application is started, by the watch application, dynamically displaying a virtual key on a screen of the Apple Watch; by the terminal, obtaining somatosensory data and key data of the virtual key from the Apple Watch, and generating a game operation instruction according to the somatosensory data and the key data; and by the terminal, sending the game operation instruction to the somatosensory game to perform a corresponding game operation. The somatosensory game operating method of the present invention has greater convenience and freedom.

7 Claims, 2 Drawing Sheets

(51) Int. Cl.
       *A63F 13/285*       (2014.01)
       *A63F 13/533*       (2014.01)
       *A63F 13/211*       (2014.01)

(58) Field of Classification Search
       CPC .......... A63F 13/22; A63F 13/42; A63F 13/52;
                                                    G06F 3/04886
       See application file for complete search history.

(56)                         References Cited

U.S. PATENT DOCUMENTS

| | | | |
|---|---|---|---|
| 2012/0253487 A1* | 10/2012 | Dugan | A63F 13/211 |
| | | | 700/91 |
| 2018/0280791 A1* | 10/2018 | Eno | G07F 17/326 |
| 2019/0163270 A1* | 5/2019 | Da Silva | A61B 5/486 |
| 2021/0400590 A1* | 12/2021 | Li | H04W 72/23 |
| 2023/0259346 A1* | 8/2023 | Liu | G06F 8/61 |
| | | | 717/174 |
| 2024/0020917 A1* | 1/2024 | Ni | G04G 21/00 |
| 2024/0111473 A1* | 4/2024 | Wang | G06F 3/1423 |
| 2024/0207682 A1* | 6/2024 | Matsimanis | A61B 5/1123 |
| 2025/0018297 A1* | 1/2025 | Zhang | A63F 13/48 |
| 2025/0018305 A1* | 1/2025 | Zhu | A63F 13/212 |
| 2025/0039503 A1* | 1/2025 | Murugan | H04N 21/44218 |
| 2025/0147778 A1* | 5/2025 | Wang | G06F 3/0485 |

* cited by examiner

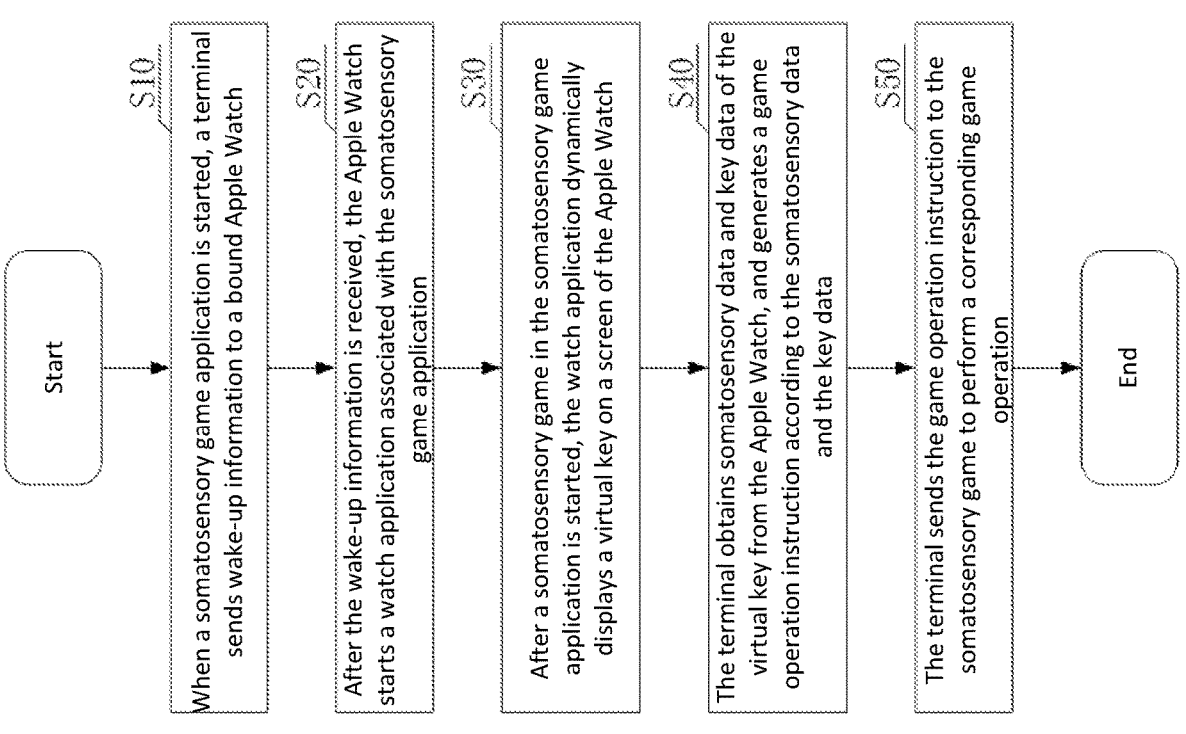

Start

S10
When a somatosensory game application is started, a terminal sends wake-up information to a bound Apple Watch S20
After the wake-up information is received, the Apple Watch starts a watch application associated with the somatosensory game application S30
After a somatosensory game in the somatosensory game application is started, the watch application dynamically displays a virtual key on a screen of the Apple Watch S40
The terminal obtains somatosensory data and key data of the virtual key from the Apple Watch, and generates a game operation instruction according to the somatosensory data and the key data S50
The terminal sends the game operation instruction to the somatosensory game to perform a corresponding game operation End

Fig. 2

APPLE WATCH-BASED SOMATOSENSORY GAME OPERATING METHOD

TECHNICAL FIELD

The present invention relates to the technical field of somatosensory games, and in particular to an Apple Watch-based somatosensory game operating method and device, and a computer-readable storage medium.

BACKGROUND

Somatosensory games have become a hot trend in the game market. By capturing a user's real movement and converting it into a virtual operation in a game, it enhances the interactivity and entertainment of the game. There are currently various somatosensory game devices based on somatosensory controllers on the market, but these devices usually require additional hardware support and are not convenient to use. Therefore, there is a need to provide a somatosensory game method based on a portable device to provide a more convenient somatosensory game experience.

SUMMARY

Embodiments of the present application provide an Apple Watch-based somatosensory game operating method, which is intended to capture a user's somatosensory data and key operation data by an Apple Watch and convert them into game operation instructions, thereby realizing a portable somatosensory game experience.

In order to achieve the above objective, the embodiments of the present application provide an Apple Watch-based somatosensory game operating method, comprising:

when a somatosensory game application is started, by a terminal, sending wake-up information to a bound Apple Watch;

after the wake-up information is received, by the Apple Watch, starting a watch application associated with the somatosensory game application;

after a somatosensory game in the somatosensory game application is started, by the watch application, dynamically displaying a virtual button on a screen of the Apple Watch;

by the terminal, obtaining somatosensory data and key data of the virtual key from the Apple Watch, and generating a game operation instruction according to the somatosensory data and the key data; and by the terminal, sending the game operation instruction to the somatosensory game to perform a corresponding game operation.

In an embodiment, dynamically displaying the virtual key on the screen of the Apple Watch by the watch application comprises:

by the watch application, obtaining game-associated data of the somatosensory game sent by the terminal to the Apple Watch, the game-associated data comprising preset key data and game scene data;

by the watch application, dynamically generating a virtual key corresponding to the preset key data and game scene data on the screen according to the game-associated data.

In an embodiment, the preset key data comprises a display parameter of the virtual key on the screen, and the display parameter comprises at least one of the following: quantity, size, color and layout.

In an embodiment, dynamically generating the virtual key corresponding to the preset key data and game scene data on the screen comprises:

at a beginning stage of the somatosensory game, sequentially generating and displaying all virtual keys of the somatosensory game on the screen according to a preset layout; and when the virtual key is generated and displayed, displaying a function prompt corresponding to the virtual key.

In an embodiment, dynamically generating the virtual key corresponding to the preset key data and game scene data on the screen further comprises:

judging an available virtual key in a current game scene according to game logic, and visually highlighting the available virtual key.

In an embodiment, visually highlighting the available virtual key comprises:

according to availability of the virtual key, dynamically adjusting a display size and/or transparency of the available virtual key on the screen, so that the available virtual key is more prominent than unavailable virtual keys.

In an embodiment, the method further comprises:

according to a requirement of the game scene, calling a vibration module of the Apple Watch to provide vibration feedback.

In order to achieve the above objective, the embodiments of the present application further propose an Apple Watch-based somatosensory game operating device, comprising a memory, a processor and an Apple Watch-based somatosensory game operating program stored on the memory and executable on the processor, wherein when the processor executes the Apple Watch-based somatosensory game operating program, any one of the Apple Watch-based somatosensory game operating methods as described above is implemented.

In order to achieve the above objective, the embodiments of the present application further propose a computer-readable storage medium, having an Apple Watch-based somatosensory game operating program stored thereon, wherein when the Apple Watch-based somatosensory game operating program is executed by a processor, any one of the Apple Watch-based somatosensory game operating methods as described above is implemented.

It can be understood that, in the technical solutions of the present application, when the somatosensory game application of the terminal is started, the watch application in the somatosensory watch is awakened, so that the watch application displays virtual keys on the screen of the somatosensory watch, and dynamically displays these virtual keys during the game. In this way, during the game, the terminal can obtain the somatosensory data and key data from the somatosensory watch to generate game operation instructions, so that the user can operate the somatosensory game through the somatosensory data and key data at the same time. It can be seen that in the technical solutions of the present application, by using the Apple Watch as an operating device, combined with the method of dynamically displaying virtual keys and obtaining somatosensory data, a more convenient, free and simplified somatosensory game operating mode is provided. Compared with traditional game controllers, the technical solutions of the present application not only provide greater convenience and freedom, but also simplify the operation process, have an independent display interface, and have multi-functionality and interactivity, providing users with a richer and more personalized somatosensory game experience.

BRIEF DESCRIPTION OF FIGURES

In order to more clearly illustrate the technical solutions in embodiments of the present invention or the prior art, the drawings needed to be used in the description of the embodiments or the prior art will be briefly described below. Obviously, the drawings in the following description are only some embodiments of the present invention, and other drawings can also be obtained by those of ordinary skill in the art from the structures illustrated in these drawings without any creative efforts.

FIG. 2 is a schematic flowchart of an Apple Watch-based somatosensory game operating method according to an embodiment of the present invention.

Figure 1:
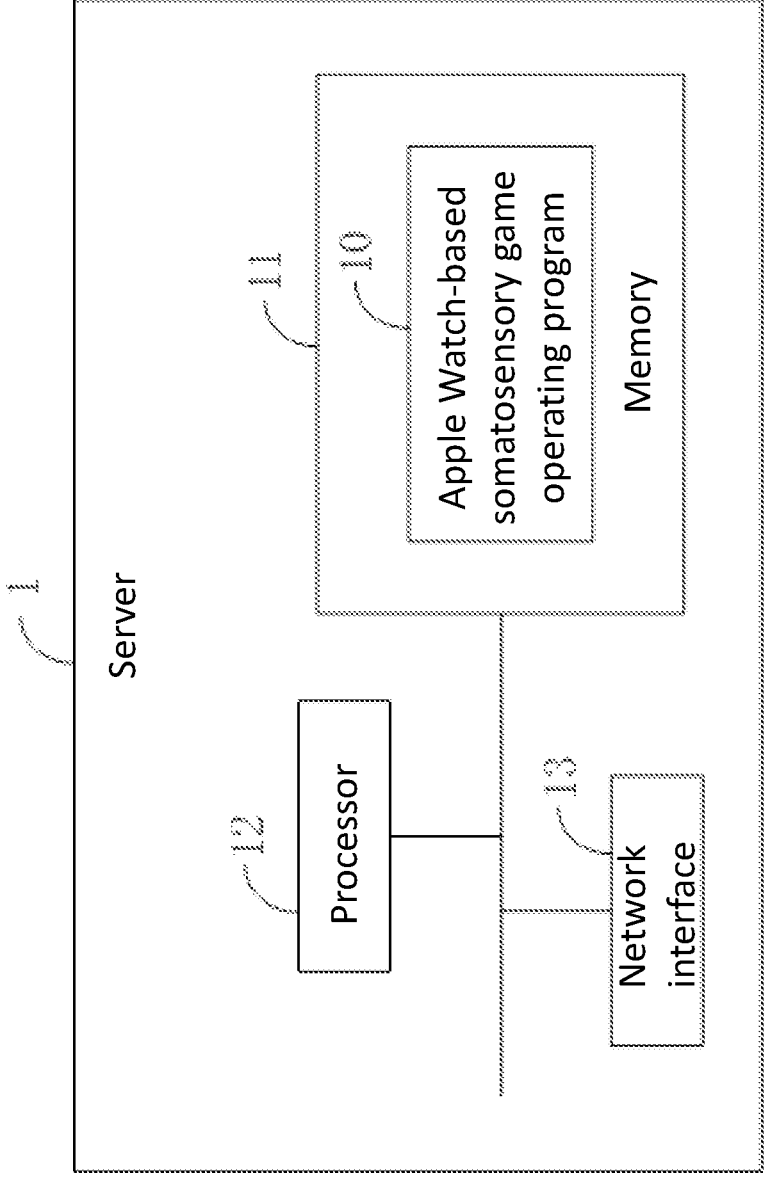
FIG. 1 is a module structural diagram of an Apple Watch-based somatosensory game operating device according to an embodiment of the present invention.

The implementation, functional features and advantages of the objective of the present invention will be further described with reference to the drawings.

DETAILED DESCRIPTION

It should be understood that specific embodiments described herein are only used to explain the present invention and are not used to limit the present invention.

In order to better understand the above technical solutions, exemplary embodiments of the present disclosure will be described in more detail below with reference to the drawings. While the exemplary embodiments of the present disclosure have been shown in the drawings, it should be understood that the present disclosure may be implemented in various forms and should not be limited by the embodiments set forth herein. Rather, these embodiments are provided so that the present disclosure can be understood more thoroughly, and the scope of the present disclosure can be fully conveyed to those skilled in the art.

It should be noted that, in the claims, any reference signs placed between parentheses shall not be construed as limiting the claims. The words "comprising" or "comprises" herein do not exclude the presence of components or steps not listed in the claims. The indefinite article "a" or "an" preceding a component does not exclude the presence of a plurality of such components. The present invention can be implemented by means of hardware including several different components, and a suitably programmed computer. In a unit claim enumerating several means, several of these means can be embodied by the same item of hardware. Moreover, the use of "first," "second," and "third," etc. does not imply any order, and these words may be construed as designations.

As shown in FIG. 1, FIG. 1 is a schematic structural diagram of a server 1 (also called an Apple Watch-based somatosensory game operating device) in a hardware running environment involved in a solution of an embodiment of the present invention.

The server of the embodiment of the present invention is, for example, an "Internet of Things device", a smart air conditioner with a networking function, a smart light, a smart power supply, an AR/VR device with a networking function, a smart speaker, a self-driving car, a PC, a smart phone, a tablet computer, an e-book reader, a portable computer, or other devices with display functions.

As shown in FIG. 1, the server 1 includes a memory 11, a processor 12 and a network interface 13.

The memory 11 includes at least one type of readable storage medium, and the readable storage medium includes a flash memory, a hard disk, a multimedia card, a card-type memory (e.g., an SD or DX memory, etc.), a magnetic memory, a magnetic disk, an optical disk or the like. In some embodiments, the memory 11 may be an internal storage unit of the server 1, such as a hard disk of the server 1. In other embodiments, the memory 11 may also be an external storage device of the server 1, such as a plug-in hard disk equipped on the server 1, a smart media card (SMC), a secure digital (SD) card, a flash card or the like.

Further, the memory 11 may also include an internal storage unit of the server 1 and an external storage device. The memory 11 can not only be used to store application software and various data installed on the server 1, such as codes of an Apple Watch-based somatosensory game operating program 10, etc., but also can be used to temporarily store data that has been output or will be output.

In some embodiments, the processor 12 may be a central processing unit (CPU), a controller, a microcontroller, a microprocessor or other data processing chips, and used to run program codes or processing data stored in the memory 11, such as the Apple Watch-based somatosensory game operating program 10, etc.

The network interface 13 may optionally include a standard wired interface and a wireless interface (such as a WI-FI interface), and is generally used to establish communication connections between the server 1 and other electronic devices.

The network may be the Internet, a cloud network, a wireless fidelity (Wi-Fi) network, a personal network (PAN), a local area network (LAN) and/or a metropolitan area network (MAN). Various devices in a network environment may be configured to connect to a communication network according to various wired and wireless communication protocols. Examples of such wired and wireless communication protocols may include, but are not limited to, at least one of the following: Transmission Control Protocol and Internet Protocol (TCP/IP), User Datagram Protocol (UDP), Hypertext Transfer Protocol (HTTP), file transfer Protocol (FTP), ZigBee, EDGE, IEEE 802.11, Optical Fidelity (Li-Fi), 802.16, IEEE 802.11s, IEEE 802.11g, multi-hop communication, wireless access point (AP), device-to-device communication, cellular communication protocol and/or Bluetooth (Blue Tooth) communication protocol, or a combination thereof.

Optionally, the server may further comprise a user interface. The user interface may include a display and an input unit such as a keyboard. Optional user interfaces may also include standard wired interfaces and wireless interfaces. Optionally, in some embodiments, the display may be an LED display, a liquid crystal display, a touch-sensitive liquid crystal display, an organic light-emitting diode (OLED) touch device, or the like. The display may also be referred to as a display screen or a display unit, and is used to display information processed in the server 1 and to display a visualized user interface.

FIG. 1 only shows the server 1 with components 11-13 and the Apple Watch-based somatosensory game operating program 10. It can be understood by those skilled in the art that the structure shown in FIG. 1 does not form a limitation of the server 1, and may include fewer or more components than shown, or combinations of certain components, or different arrangements of components.

In this embodiment, the processor 12 may be used to call the Apple Watch-based somatosensory game operating program stored in the memory 11, and perform the following operations:

when a somatosensory game application is started, by a terminal, sending wake-up information to a bound Apple Watch;

after the wake-up information is received, by the Apple Watch, starting a watch application associated with the somatosensory game application;

after a somatosensory game in the somatosensory game application is started, by the watch application, dynamically displaying a virtual key on a screen of the Apple Watch;

by the terminal, obtaining somatosensory data and key data of the virtual key from the Apple Watch, and generating a game operation instruction according to the somatosensory data and the key data; and by the terminal, sending the game operation instruction to the somatosensory game to perform a corresponding game operation.

In an embodiment, the processor 12 may be used to call the Apple Watch-based somatosensory game operating program stored in the memory 11, and perform the following operations:

dynamically displaying the virtual key on the screen of the Apple Watch by the watch application comprises:

by the watch application, obtaining game-associated data of the somatosensory game sent by the terminal to the Apple Watch, the game-associated data comprising preset key data and game scene data;

by the watch application, dynamically generating a virtual key corresponding to the preset key data and game scene data on the screen according to the game-associated data.

In an embodiment, the processor 12 may be used to call the Apple Watch-based somatosensory game operating program stored in the memory 11, and perform the following operations:

the preset key data comprises a display parameter of the virtual key on the screen, and the display parameter comprises at least one of the following: quantity, size, color and layout.

In an embodiment, the processor 12 may be used to call the Apple Watch-based somatosensory game operating program stored in the memory 11, and perform the following operations:

at a beginning stage of the somatosensory game, sequentially generating and displaying all virtual keys of the somatosensory game on the screen according to a preset layout; and when the virtual key is generated and displayed, displaying a function prompt corresponding to the virtual key.

In an embodiment, the processor 12 may be used to call the Apple Watch-based somatosensory game operating program stored in the memory 11, and perform the following operations:

judging an available virtual key in a current game scene according to game logic, and visually highlighting the available virtual key.

In an embodiment, the processor 12 may be used to call the Apple Watch-based somatosensory game operating program stored in the memory 11, and perform the following operations:

according to availability of the virtual key, dynamically adjusting a display size and/or transparency of the available virtual key on the screen, so that the available virtual key is more prominent than unavailable virtual keys.

In an embodiment, the processor 12 may be used to call the Apple Watch-based somatosensory game operating program stored in the memory 11, and perform the following operations:

according to a requirement of the game scene, calling a vibration module of the Apple Watch to provide vibration feedback.

Based on the hardware architecture of the Apple Watch-based somatosensory game operating device described above, an embodiment of an Apple Watch-based somatosensory game operating method is proposed. The Apple Watch-based somatosensory game operating method of the present invention is intended to capture the user's somatosensory data and key operation data by the Apple Watch and convert them into game operation instructions, thereby realizing a portable somatosensory game experience.

Referring to FIG. 2, FIG. 2 shows an Apple Watch-based somatosensory game operating method according to an embodiment of the present invention. The Apple Watch-based somatosensory game operating method includes the following steps:

S10: When a somatosensory game application is started, a terminal sends wake-up information to a bound Apple Watch.

Here, the terminal refers to a smart device that can be bound with the Apple Watch, such as an Apple mobile phone, an Apple computer, an Apple tablet, etc. It is worth noting that the communication link between the Apple Watch and the terminal is usually established based on the Bluetooth protocol.

The experience game application refers to a somatosensory game application program installed in the above device, which will act as a bridge to communicate with the Apple Watch, so as to control the game operation and receive data from a sensor of the Apple Watch.

Specifically, when a user starts the somatosensory game application on the terminal device, the terminal device will send a wake-up message to the bound Apple Watch. The wake-up information may be transmitted using the Bluetooth communication protocol, and commands or identifiers are usually sent through the Bluetooth connection between the devices. After the Apple Watch receives the wake-up information from the terminal device, the somatosensory game application installed on the watch will be woken up and started. This means that the watch application program is ready to start receiving data from the watch sensor and transmitting it back to the somatosensory game application on the terminal device. In addition, the application on the Apple Watch may also be used to record the user's exercise data, such as heart rate data, calorie consumption and other data, to record the user's exercise performance when playing the somatosensory game.

This setting can enable the Apple Watch to automatically enter the game state in cooperation with the somatosensory game, so as to improve the user experience.

S20: After the wake-up information is received, the Apple Watch starts a watch application associated with the somatosensory game application.

Here, the watch application is associated with the somatosensory game application, which means that there is a communication or cooperation relationship between them to realize the interaction of somatosensory game operations.

Specifically, the Apple Watch receives specific wake-up information, and it checks the existence of the watch application associated with the somatosensory game application and starts it. Once the watch application associated with the somatosensory game application is successfully started, it will be ready to receive data from the terminal device and the Apple Watch sensor.

S30: After a somatosensory game in the somatosensory game application is started, the watch application dynamically displays a virtual key on a screen of the Apple Watch.

Here, the somatosensory game application runs on the terminal device as a software application, and it communicates with the Apple Watch to receive the somatosensory data obtained from the watch sensor. Then, the somatosensory game application processes and analyzes the data, and converts the data into game operation instructions, which are used to drive the somatosensory game. Therefore, the somatosensory game application provides a platform for users to interact with the somatosensory game, and realizes the connection between the user's actual actions and the game world through the somatosensory data acquisition function of the Apple Watch.

The virtual key refers to a touchable area displayed on the screen in the form of an icon, a button or other forms, and is used to simulate the function of a physical key. In the technical solution of the present application, the virtual key is displayed on the screen of the Apple Watch, and the user can interact with it by touching the screen.

For example, the virtual key may include an arrow key, an action key, a menu key and other keys to meet the operation requirements of different games.

Dynamic display refers to presenting the virtual key on the screen in an animation or real-time update manner. Specifically, dynamically displaying the virtual key may include the following aspects:

1. Animation effect: The appearance and disappearance of the virtual key may be presented through an animation effect, such as fade in and fade out, pop up, slide, etc.
2. Real-time update: The display of the virtual key may be updated in real time as the game progresses. According to the changes of the game scene or the needs of the user's operation, the position, style or function of the virtual key may be adjusted in real time. For example, in different game stages or levels, the display of the virtual key may be changed as the game progresses, so as to provide a more accurate and adaptable operation interface.
3. Interactive feedback: The dynamic display of the virtual key may provide interactive feedback through a visual effect. When the user touches the virtual key, the user's operation may be fed back by changing the color, shape or animation effect, so as to enhance the user's interactive experience and perceptibility of operation.
4. Response to user actions: The display of the virtual key may interact with user actions. For example, when the user slides a finger on the screen or performs a gesture operation, the display of the virtual key may be changed according to the direction and speed of the gesture, so as to increase the interactivity with the user.

By dynamically displaying the virtual key, the operation interface may be made more vivid and intuitive, and a richer user interaction experience may be provided. The user may understand the current operating state by observing the dynamic changes of the virtual key, and make corresponding operations, so as to better control the progress of the somatosensory game. It can be understood that by dynamically displaying the virtual key on the Apple Watch, the user can directly perform game operations on the watch screen without requiring additional devices or screen space. This operation manner makes the operation of the somatosensory game more intuitive and convenient, thereby providing a more free gaming experience. Besides, the watch application may flexibly adjust the design and display of the virtual key according to the needs of specific games to meet the operating requirements of different games.

S40: The terminal obtains somatosensory data and key data of the virtual key from the Apple Watch, and generates a game operation instruction according to the somatosensory data and the key data.

Here, somatosensory data includes but is not limited to acceleration data, gyroscope data, heart rate data, etc. The somatosensory data can be collected through sensors on the Apple Watch, such as accelerometers, gyroscopes, and heart rate sensors.

The key data refers to data that records the user's operation behavior on the virtual key. In the technical solution of the present application, the key data is used to describe the user's operation of pressing, releasing or sliding the virtual key on the Apple Watch.

For example, the key data may include the following: key type, key state, key position, key duration, sliding operation, etc.

Here, the key type is used to record the type of the virtual key pressed or released by the user. Each virtual key may be assigned with a unique identifier or name, which is used to identify a specific key operated by the user, for example, an arrow key, an action key, a menu key, etc.

The key state is used to record the state of the virtual key, that is, being pressed or released. When the user presses the virtual key, the key state is marked as a pressed state; when the user releases the virtual key, the key state is marked as a released state. The changes in these states may be used to determine an operation action performed by the user.

The key position is used to record the position of the virtual key on the screen. By recording the position of the key, specific position information of the user pressing or releasing the virtual key may be determined. This can help determine the user's precise operational intent and perform corresponding game actions.

The key duration is used to record a duration of the user pressing or releasing the virtual key. By recording the duration of the key, the time information of the user pressing the key may be obtained, so that corresponding operation feedback or game action adjustments can be performed according to the duration of the key.

The sliding operation is used to record data of a sliding operation performed by the user on the virtual key. For example, the user may slide on a virtual joystick to simulate a moving direction of a character, or slide on a slide bar to adjust a game setting or the like. The data of the sliding operation may include information of sliding, such as a direction, a distance, and a speed.

It can be understood that by recording the key data, the system can obtain the user's operation behavior on the virtual key in the somatosensory game. In addition, the key data may be used to analyze the user's operating habits, evaluate the user experience of the game, and provide a basis for the generation of subsequent operation instructions of the game.

Specifically, after the somatosensory game is started, the somatosensory game application sends a data request to the Apple Watch application, indicating that it needs to obtain somatosensory data. After receiving the data request from the somatosensory game application, the Apple Watch application starts to collect somatosensory data from sensors (such as an accelerometer, a gyroscope, etc.) on the watch and obtain key data. The watch application transmits the collected somatosensory data and key data back to the terminal.

Further, the terminal generates, according to the somatosensory data and the key operation data of the virtual key obtained from the Apple Watch, a game operation instruction through an algorithm or logic processing. The somatosensory data may include information such as acceleration, posture and direction, and the key operation data of the virtual key may indicate an action such as pressing, releasing or long pressing.

S50. The terminal sends the game operation instruction to the somatosensory game, so as to perform a corresponding game operation.

Specifically, the terminal may encapsulate the generated game operation instruction so as to transmit it in network or communication transmission. This may include packaging the instruction in a specific data format, and adding an identifier or metadata to indicate the type and target of the instruction.

Then, the terminal sends the packaged game operation instruction to the somatosensory game in a suitable communication manner. The somatosensory game receives and analyzes the game operation instruction sent by the terminal. The game may perform, according to the type and content of the instruction, a corresponding game operation, such as moving a character, firing a bullet or jumping.

Through the above steps, the present application implements the Apple Watch-based somatosensory game operating method. By performing a natural movement and posture on the Apple Watch, combined with the operation of the virtual key, the user may control the progress of the somatosensory game to enhance the convenience and freedom of the gaming experience.

It can be understood that the Apple Watch-based somatosensory game operating method of the technical solution of the present application has the following advantages over the somatosensory games using game controllers as instruction input:

1. Convenience and freedom: The technical solution of the present application uses the Apple Watch as an operating device without the need for additional game controllers. The user only needs to wear the Apple Watch so that he can operate the game through the virtual keys and somatosensory data on the watch, without being limited by physical controllers. This provides greater convenience and freedom, and the user can play the somatosensory game anytime and anywhere, without the need to carry additional devices.

2. Simplification of operation process: A traditional somatosensory game usually requires the user to connect the game controller first, and then perform operations such as device pairing and calibration before starting the game. In contrast, in the technical solution of the present application, the user only needs to start the somatosensory game application through the Apple Watch, the watch application will be automatically associated with the game, and virtual keys will be displayed on the watch screen, which greatly simplifies the operation process and provides a faster and more direct way to start the game.

3. Independent display interface: A traditional somatosensory game controller usually relies on a main display device (such as a TV or computer screen) to display a game interface. In contrast, in the technical solution of the present application, the screen of the Apple Watch is used to dynamically display virtual keys, so that the user can directly perform game operations on the watch screen. This independent display interface not only saves the space and resources of the main display device, but also provides the user with a more personalized and private gaming experience.

4. Versatility and interactivity: As a smart watch, the Apple Watch has a variety of sensors and functions that can track the user's movement, posture and health data. In the technical solution of the present application, somatosensory data is obtained through the Apple Watch, and combined with the operation of virtual keys, more functions and interactivity are provided. The user may use the sensors of the watch to capture motion more accurately and achieve more detailed game operations, and may also combine health data with the somatosensory game to provide a more personalized and health-conscious gaming experience.

In some embodiments, dynamically displaying the virtual key on the screen of the Apple Watch by the watch application includes:

S31. The watch application obtains game-associated data of the somatosensory game sent by the terminal to the Apple Watch, the game-associated data including preset key data and game scene data.

Here, the preset key data refers to pre-defined or preset key information, including the type, style, position function and the like of the key. The key data is intended to provide a set of default or standard key layouts and configurations for the somatosensory game. For example, direction keys, action keys, menu keys, etc., may all be used as a part of the preset key data. The setting of preset key data may be optimized according to the requirements of game design and operating habits, so as to provide an intuitive and easy-to-operate game control manner.

The game scene refers to a specific environment and situation in which the somatosensory game is performed. The game scene includes game backgrounds, levels, battle scenes, etc. These scenes may affect the display and function of the virtual key. For example, in a parkour game, the game scene may be switched to a rugged mountain road. At this time, the display and function of the virtual key may be adjusted accordingly to meet the player's operation needs in this scene.

Specifically, the preset key data provides basic information such as the key type, style and position of the key for the watch application. The information is used to generate the appearance and layout of the virtual key, ensuring the recognizability and ease of use of the key. The game scene provides the opportunity to adjust the virtual key according to the current game environment. The watch application may adjust the display and function of the virtual key according to the changes of the game scene, so as to better adapt to the player's operation needs and experience in different scenes.

Specifically, the terminal may transmit game-associated data to the watch application when the somatosensory game application is started. This transmission may be performed by means of a wireless connection, such as Bluetooth or Wi-Fi direct connection, for data transmission. The terminal packages the preset key data and game scene data into a data package of a specific format, and sends it to the watch application through a communication protocol.

S32. The watch application dynamically generates the virtual key corresponding to the preset key data and game scene data on the screen according to the game-associated data.

Specifically, during the game, the watch application may analyze and process the obtained game-associated data. It will read preset key data and game scene data, and convert them into usable internal data structures or variables for subsequent virtual key generation and display operations. Based on the analyzed and processed game-associated data, the watch application starts to dynamically generate a virtual key. It will create corresponding virtual keys on the screen of the Apple Watch based on the information in the preset key data, including the key type, style and position.

It can be understood that by combining the preset key data and the game scene, the watch application can dynamically generate the virtual keys associated with the game on the screen of the Apple Watch, and provide an operation interface that meets the requirements and scenes of the game. This dynamic generation manner allows the virtual keys to be adjusted and updated in real time according to different stages of the game or changing scenes. The user may perform game operations through these dynamically displayed virtual keys on the watch, which enhances the interactivity and playability of the game.

In some embodiments, the preset key data includes a display parameter of the virtual key on the screen, and the display parameter includes at least one of the following: quantity, size, color, and layout.

Specifically, the following is an explanation of the above display parameters:

Quantity: The number of virtual keys may be defined in the preset key data. This specifies the number of virtual keys that are simultaneously displayed on the screen of the Apple Watch. According to the game design and operation requirements, a single key or multiple keys may be provided, and the position and arrangement thereof may be determined.

Size: The size of the virtual key may be specified in the preset key data. The size of a key determines the size of its touchable area on the screen. A large key size increases touch accuracy and ease of use, while a smaller key size provides more screen space for other elements.

Color: The color of the virtual key may be defined in the preset key data. The color of a key may be set according to the style and theme of the game. By using a different color, the recognizability and attractiveness of the key may be increased, making it more prominent on the screen.

Layout mode: The layout mode of the virtual key may be determined in the preset key data. The layout mode specifies the relative position and arrangement of the keys on the screen. Different layout modes such as horizontal layout, vertical layout, and grid layout may be used to arrange the positions of virtual keys to meet the needs of game operations.

It can be understood that by setting these display parameters in the preset key data, the watch application can dynamically generate corresponding virtual keys on the screen of the Apple Watch according to these parameters. In this way, the user may perform game operations by touching these virtual keys according to the display parameters defined by the game-associated data. This flexibility enables the watch application to provide virtual key displays that meet user expectations and operating experience according to the requirements and design of the game.

In some embodiments, dynamically generating the virtual key corresponding to the preset key data and game scene data on the screen includes:

S110: At a beginning stage of the somatosensory game, sequentially generate and display all virtual keys of the somatosensory game on the screen according to a preset layout.

Specifically, according to the preset number, size, color and layout of keys, the watch application will dynamically create corresponding virtual keys on the screen. The order in which the keys are generated may be arranged according to the definition of the preset layout mode.

S120: When the virtual key is generated and displayed, display a function prompt corresponding to the virtual key.

Specifically, around or above the virtual key, the watch application displays the function description or operation prompt of the corresponding key in the form of text, an icon or other forms. In this way, users can clearly understand the function represented by each virtual key, helping them to perform correct operations.

Through the above solution, the watch application can dynamically generate and display virtual keys adapted to game requirements and scenes according to the preset key data and the game scene data at the beginning of the somatosensory game. Besides, when the virtual keys are generated, function prompts corresponding to the keys are provided, so as to increase the users' understanding of the key functions and the accuracy of operation. Such an embodiment can provide a more intuitive and easy-to-use somatosensory game operation interface, enabling users to better understand and grasp the main points of game operation.

In some embodiments, dynamically generating virtual keys corresponding to the preset key data and game scene data on the screen further includes:

judging an available virtual key in a current game scene according to game logic, and visually highlighting the available virtual key.

Here, the game logic is an operation process and decision-making process in the game, which defines a triggering condition, judgment mechanism and response mechanism of an event in the game.

Here, the game logic defines a condition of triggering a specific event or action. For example, when a player reaches a specific score, completes a task, or triggers a specific button, a corresponding event or behavior may be triggered.

The judgment mechanism determines a way to judge a specific event in the game, for example, judging whether a player successfully defeats an enemy, passes a level, or successfully completes a task, and so on.

The response mechanism determines a behavior of the game to respond to a specific event or condition. For example, according to an action or decision of a player, the game may give a reward, a switch scene, a playback animation, etc.

Specifically, according to the current game logic and game scene data, the watch application may make a judgment to determine which virtual keys may be used in the current game scene. This includes judging available virtual keys according to conditions such as the player's position, character status and item status.

Further, once the available virtual keys are judged according to the game logic, the watch application will visually highlight these available keys to increase the user's visual recognition and operational accuracy. This may be implemented by changing the appearance, color, transparency, blinking, etc. of the keys, so that these virtual keys are distinguished from other keys on the screen and attract the user's attention. Through this highlighting, the user can more easily identify which virtual keys are currently available, so as to perform corresponding operations in the game.

It can be understood that by judging the available virtual keys according to the game logic and visually highlighting these keys, the watch application can provide a more intuitive and clear operation interface. In this way, the user can more easily identify and operate the virtual keys that match the current game scene, thereby improving the playability and user experience of the game. Besides, the identification and visual highlighting of the available virtual keys determined according to the game logic can help the user quickly make a correct operation choice in a tense game environment.

In some embodiments, visually highlighting available virtual keys includes:

according to availability of the virtual key, dynamically adjusting a display size and/or transparency of the available virtual key on the screen, so that the available virtual key is more prominent than unavailable virtual keys.

Here, the unavailable virtual keys refer to virtual keys that cannot be used or triggered by the user in a specific game scene or condition. The following are some exemplary scenes of unavailable virtual keys:

1. Game restrictions: The unavailable virtual keys may be restricted by game rules or design. Game developers may disable or restrict the use of certain keys in certain game scenes or specific game stages. This could be to keep the game balanced, add challenge, or provide a specific gaming experience.

2. Character status: The availability of unavailable virtual keys may be affected by the character status. For example, certain keys may be disabled or fail to trigger while a character is rooted, stunned, or otherwise. This may reflect a character's current action capabilities or limitations to add to the strategy and tactics of the game.

3. Item usage: The unavailable virtual keys may be associated with the usage or availability of items. Certain keys may require specific items or resources to be triggered or used, and may be disabled if the player does not have the corresponding items or resources. This can prompt the player to make in-game resource management and strategic decisions.

4. Game progress: The availability of unavailable virtual keys may change as the game progresses. During different stages or levels of the game, certain keys may not be available at the beginning, but as the game progresses, the player may unlock or gain access to use these keys.

The presence of unavailable keys adds depth and challenge to the game. It prompts the player to make adaptive and strategic decisions in the game while adding variety and complexity to the game.

Specifically, according to the game logic or other relevant conditions, the watch application judges the availability of each virtual key. This may be based on the player's position, character status, item status, etc. to determine whether the key is available. For example, a key may only be available at a specific game stage or under a specific condition.

Once the available virtual keys are determined, the watch application will dynamically adjust the display properties of these keys on the screen, including size and/or transparency, according to their availability. The available virtual keys may be set to a larger or brighter display to make them more prominent and easy to touch on the screen. The unavailable virtual keys may be set to a smaller or darker display to reduce distraction or to alert the user of their unavailable status.

It can be understood that the watch application enhances the prominence of the available virtual keys by dynamically adjusting the display size and/or transparency of these keys. This makes it easier for the user to distinguish between available and unavailable keys, and to quickly make a correct operation selection. With the enhanced visual prominence, the user can interact with the game more intently and reduce unintended touches on unavailable keys. Such an implementation can improve the playability and user experience of the game, enabling the user to participate in the game more smoothly and obtain better operation feedback.

In some embodiments, the method of the present application further includes: calling, according to a requirement of the game scene, a vibration module of the Apple Watch to provide vibration feedback.

Specifically, according to the current game scene and situation, the watch application may determine the timing and conditions for providing vibration feedback. This may be decided based on game events, character behavior, collisions, special effects, etc.

Once the timing when vibration feedback needs to be provided is determined according to the needs of the game scene, the watch application will call the vibration module of the Apple Watch to trigger the vibration. By using a corresponding programming interface or software development kit (SDK), the watch application may send a vibration instruction to the Apple Watch to start the vibration feedback.

Once the vibration module of Apple Watch is called, the watch will generate corresponding vibration feedback. This feedback may be a single brief vibration, or a continuous or patterned sequence of vibrations, depending on the needs of the game scene and design. Vibration may be implemented by a vibration motor or vibrator of the watch, providing the user with a tactile feedback experience. Vibration feedback may match in-game actions, collisions, special effects, etc., to enhance user perception and experience. For example, when a player makes an attack, receives damage, triggers a special skill, or encounters an important event, the watch may provide corresponding vibration feedback to make the user more involved and invested in the game.

It can be understood that by calling the vibration module of the Apple Watch according to the requirements of the game scene, the method of the present application can provide a tactile feedback experience for the somatosensory game. This vibration feedback can enhance the immersion and realism of the game and provide a richer interactive experience. At the same time, by flexibly calling the vibration module according to the game scene, the watch application can provide different types and intensities of vibration feedback according to different situations and events, bringing users a more diverse and personalized gaming experience.

In addition, an embodiment of the present invention also proposes a computer-readable storage medium, which may be any one of or any combination of a hard disk, a multimedia card, an SD card, a flash memory card, an SMC, a read-only memory (ROM), an erasable programmable read-only memory (EPROM), a portable compact disk read-only memory (CD-ROM), a USB memory, etc. The computer-readable storage medium comprises the Apple Watch-based somatosensory game operating program. Specific implementations of the computer-readable storage medium of the present invention are substantially the same as those of the Apple Watch-based somatosensory game operating method and the server 1 described above, and they will not be repeated here.

It should be understood by those skilled in the art that the embodiments of the present invention may be provided as methods, systems, or computer program products. Therefore, the present invention can take the form of an entirely hardware embodiment, an entirely software embodiment, or an embodiment combining software and hardware aspects. Furthermore, the present invention may take the form of a computer program product embodied on one or more computer-usable storage media (including but not limited to disk storage, CD-ROM, optical storage, etc.) having computer-usable program code embodied therein.

The present invention is described with reference to flowcharts and/or block diagrams of methods, devices (systems), and computer program products according to embodiments of the invention. It should be understood that each procedure and/or block in the flowcharts and/or block diagrams, and combinations of procedures and/or blocks in the flowcharts and/or block diagrams can be implemented by computer program instructions. These computer program instructions may be supplied to a general purpose computer, a special purpose computer, an embedded processor, or a processor of other programmable data processing equipment to produce a machine, so that the instructions executed by the computer or the processor of other programmable data processing equipment produce means for implementing the function(s) specified in one or more steps of the flowcharts and/or one or more blocks of the block diagrams.

These computer program instructions may also be stored in a computer-readable memory capable of directing a computer or other programmable data processing equipment to operate in a specific manner, so that the instructions stored in the computer-readable memory produce an article of manufacture comprising instruction means. The instruction means implement the function(s) specified in one or more procedures of the flowcharts and/or one or more blocks of the block diagrams.

These computer program instructions may also be loaded onto a computer or other programmable data processing equipment, causing a series of operation steps to be performed on the computer or other programmable equipment to produce a computer-implemented process, so that the instructions executed on the computer or other programmable equipment provide steps for implementing the function(s) specified in one or more procedures of the flowcharts and/or one or more blocks of the block diagrams.

While preferred embodiments of the present invention have been described, additional changes and modifications to these embodiments can be made by those skilled in the art once they are aware of basic inventive concepts. Therefore, it is intended that the appended claims be construed to cover the preferred embodiment as well as all changes and modifications which fall within the scope of the present invention.

Obviously, those skilled in the art can make various changes and modifications to the present invention without departing from the spirit and scope of the present invention. Thus, if these modifications and variations of the present invention fall within the scope of the claims of the present invention and equivalent technologies thereof, the present invention is also intended to comprise these modifications and variations.

What is claimed is:

1. A method, comprising:
when a somatosensory game application is started on a terminal, sending wake-up information to a smart watch by the terminal;
after the smart watch receives the wake-up information, starting a watch application associated with the somatosensory game application on the smart watch;
after a somatosensory game in the somatosensory game application is started, dynamically displaying a virtual key on a screen of the smart watch by the watch application;
by the terminal, obtaining somatosensory data and key data of the virtual key from the smart watch, and generating a game operation instruction according to the somatosensory data and the key data; and
by the terminal, sending the game operation instruction to the somatosensory game to perform a corresponding game operation;
wherein dynamically displaying the virtual key on the screen of the smart watch by the watch application comprises:
by the watch application, obtaining game-associated data of the somatosensory game sent by the terminal to the smart watch, the game-associated data comprising preset key data and game scene data;
by the watch application, dynamically generating the virtual key corresponding to the preset key data and game scene data on the screen according to the game-associated data;
wherein dynamically generating the virtual key corresponding to the preset key data and game scene data on the screen comprises:
at a beginning stage of the somatosensory game, sequentially generating and displaying all possible virtual keys of the somatosensory game on the screen according to a preset layout; and
when the virtual key is generated and displayed, displaying a function prompt corresponding to the virtual key.

2. The method according to claim 1, wherein the preset key data comprises a display parameter of the virtual key on the screen, and the display parameter is selected from a group consisting of: quantity, size, color and layout.

3. The method according to claim 1, wherein dynamically generating the virtual key corresponding to the preset key data and game scene data on the screen further comprises:
judging an available virtual key in a current game scene according to game logic, and visually highlighting the available virtual key.

4. The method according to claim 3, wherein visually highlighting the available virtual key comprises:
according to availability of the virtual key, dynamically adjusting a display size and/or transparency of the available virtual key on the screen, so that the available virtual key is more prominent than unavailable virtual keys.

5. The method according to claim 1, further comprising:
according to a requirement of a game scene, calling a vibration module of the smart watch to provide vibration feedback.

6. A device, comprising a memory, a processor and an smart watch-based somatosensory game operating program stored on the memory and executable on the processor, wherein when the processor executes the smart watch-based somatosensory game operating program, the method according to claim 1 is implemented.

7. A non-transitory computer-readable storage medium, having an smart watch-based somatosensory game operating program stored thereon, wherein when the smart watch-based somatosensory game operating program is executed by a processor, the method according to claim 1 is implemented.

\* \* \* \* \*